Dec. 27, 1938.   R. L. TWEEDALE   2,141,945
POWER TRANSMISSION
Filed April 29, 1936
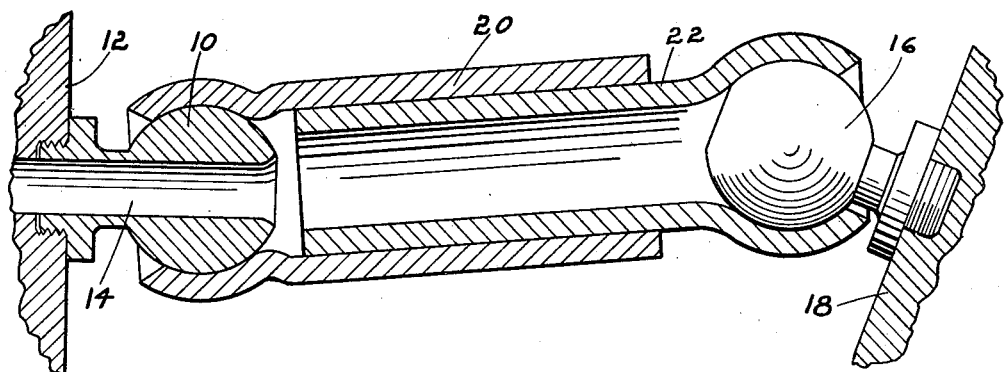
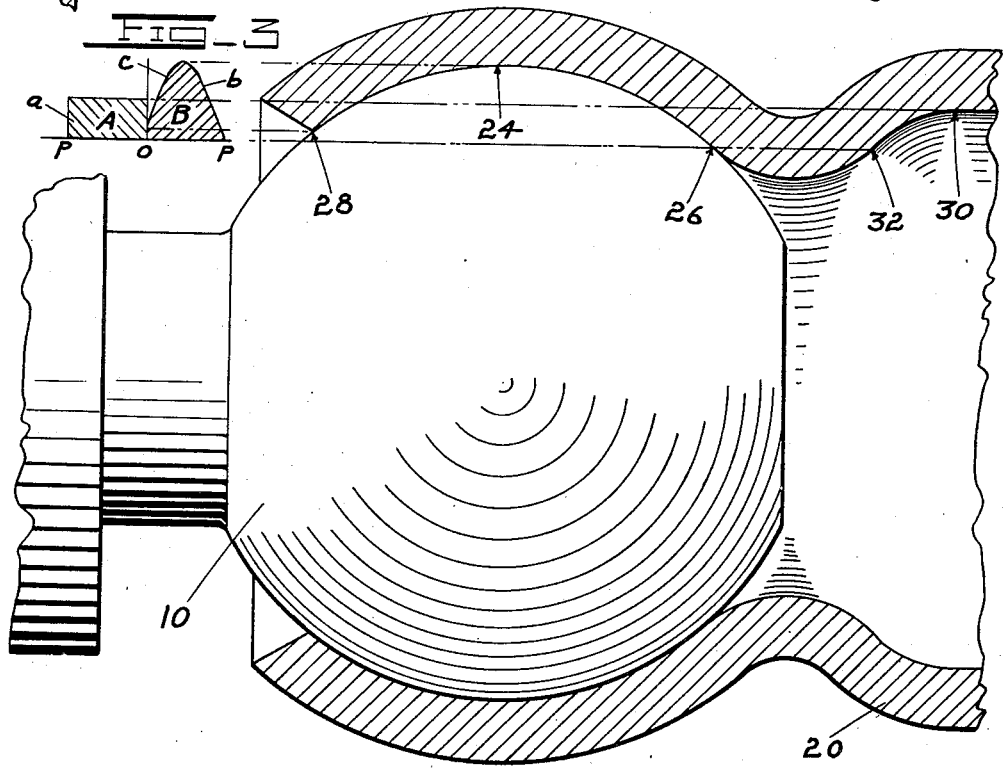
INVENTOR
Ralph L. Tweedale Patented Dec. 27, 1938

2,141,945

UNITED STATES PATENT OFFICE 2,141,945

POWER TRANSMISSION

Ralph L. Tweedale, Waterbury, Conn., assignor to The Waterbury Tool Company, Waterbury, Conn., a corporation of Connecticut Application April 29, 1936, Serial No. 76,943

10 Claims. (Cl. 103—162)

This invention relates to power transmissions and particularly to those of the fluid type of which a common form comprises generally two or more fluid pressure energy translating devices, one of which may function as a pump and another as a motor. One class of apparatus of this character employs expansible chamber forming means such as a plurality of pistons reciprocating in cylinders; a suitable motion converting means between the reciprocating pistons and a rotating shaft being provided, together with suitable valving means for controlling the admission and exhaust of fluid to and from the cylinders. The expansible chamber forming means may be connected to the motion converting means by means of one or more pivotal joints such for example as a joint of the ball and socket type. Such joints as heretofore constructed have been subjected to loading in the direction of the cylinder axis which has produced friction and consequent wear of the joint members, regardless of the adequancy of lubrication.

It is an object of the present invention to construct a fluid pressure energy translating device wherein a pivotal joint associated with expansible chamber mechanism is balanced so that the joint is not subject to load by the fluid pressure forces created in the expansible chamber.

Further objects and advantages of the present invention will be apparent from the following description, reference being had to the accompanying drawing wherein a preferred form of the present invention is clearly shown.

In the drawing:

Fig. 1 is a longitudinal sectional view of expansible chamber mechanism embodying one form of the present invention.

Fig. 2 is a fragmentary view corresponding to Fig. 1 on a larger scale.

Fig. 3 is a pressure distribution diagram showing the fluid pressure forces acting on the mechanism in Fig. 2.

In the form of the invention illustrated, a pivot member 10 is secured to a member 12 and has a passage 14 therethrough for the induction and eduction of fluid. A pivot member 16 is secured to a member 18, the member 16 preferably being solid. The members 12 and 18 represent parts of a motion converting mechanism by which the pivots 10 and 16 are caused to reciprocate toward and away from each other.

While the particular form of the motion converting means forms no part of the present invention, the member 12 may conveniently carry a plurality of pivots 10 arranged in a circle around a central axis upon which the member 12 is adapted to rotate and the member 18 may be constrained to rotate in a plane inclined to the axis upon which the member 12 rotates. Mechanism of this general character is well-known as represented by the "Waterbury" type of fluid transmission and when incorporated with such a device, the member 12 may correspond to the ported end of the cylinder barrel while the member 18 may correspond to the socket ring. One form of fluid pressure energy translating device with which the present invention may be used is illustrated in the copending application of Thomas B. Doe and Edwin L. Rose, Serial No. 76,961 filed concurrently herewith.

A cylindrical sleeve 20 embraces the spherical outer surface of the pivot member 10 by means of a complementary spherical surface formed on the left-hand end of the sleeve 20. Likewise a sleeve 22 slideable within the sleeve 20 embraces the outer spherical surface of the pivot member 16. The sleeves 20 and 22 are preferably assembled to the pivot members by deforming the respective outer ends of the sleeves as illustrated in Fig. 1.

In order to completely balance the fluid pressure forces exerted on the sleeve 20 and the sleeve 22 in a direction axially of the sleeves, the diameter of the spherical surface of the pivots 10 and 16 and the diameter of the minimum circle of contact with the sleeves is so correlated to the internal diameter of the sleeve 20 that the net resultant axial force on either sleeve is zero. Thus with a given chamber diameter, the great circle diameter of the spherical pivot surface taken at a point 24 may be chosen somewhat larger than the chamber diameter and the diameter of the minimum contact circle perpendicular to the sleeve axis, taken at a point 26 may be chosen somewhat less than the chamber diameter. For example, these diameters may conveniently be chosen so that the chamber diameter is the average between them. The diameter of the minimum contact circle on the far side of the spherical pivot from the expansible chamber, taken at a point 28 may be calculated from the laws of viscous fluid flow through a passage such as that represented by the spherical surface of contact, to produce the desired balancing of forces on the sleeve 20.

Since the forces created by fluid pressure within the expansible chamber in an axial direction are always proportional to the pressure within the chamber and since the curve of pressure drop through the contact surfaces from the point 26 to the point 28 may be readily computed for any chosen dimensions of the spherical contact surfaces, the diameter of the minimum contact circle at 28 may be derived mathematically to satisfy the condition that the resultant axial force on the sleeve 20 due to fluid pressure is zero. Thus within the sleeve 20 from a point 30 to a point 32 where the diameter is equal to the diameter at 26, the full pressure P existing in the expansible chamber is effective to produce endwise force toward the left represented in Fig. 3 by the area A to the right of the straight line pressure curve a.

This figure is a diagram of pressure plotted horizontally against the projected area plotted vertically, and assuming pressure outside the expansible chamber is zero. The axial components of force exerted on the sleeve between the points 32 and 26 being equal and in opposite directions do not produce any resultant force on the sleeve 20. The fluid pressure within the contact surface drops from the point 26 to the point 24 along a curve indicated at b (Fig. 3) to a value close to but slightly less than $$\frac{P}{2}$$

at the point 24. The net force exerted over this area is in the opposite direction to and considerably greater than the force represented by the area A in Fig. 3.

From the point 24 to the point 28 the pressure drops to zero along a curve indicated at c which, for the sake of clearness in Fig. 3, is shown as opposite to its true direction and is therefore subtracted from the area to the left of the curve b to produce the area B. The diameter of the minimum contact circle at point 28 is therefore chosen such that the area A is equal to the area B in Fig. 3. With this condition established it is apparent that the sleeve 20 is under no load in the axial direction. From this it follows that the entire axial thrust of the fluid pressure within the expansible chamber is taken directly on the pivot member 10 and on the fluid within the passage 14. Likewise, the diameter of the spherical surface of the pivot 16 and the minimum contact diameters of the sleeve 22 thereupon may be made identical to the chosen and calculated values for the pivot 10 and sleeve 20.

It will be seen that with the pivotal joints balanced in this manner the amount by which the sleeves embrace the spherical surfaces of the pivots may be made very small inasmuch as no force other than that due to friction between the sleeves 20 and 22 and that due to the inertia of the sleeve 22, in the case of the pivot 16, is required to be transmitted from the pivot to the sleeve.

In the case of machines wherein the friction and inertia forces are relatively low, the arc of contact of the sleeve with the pivot may be made small. In these circumstances the pressure drop curves b and c (Fig. 3) approach very close to a sinusoidal form. In such cases it may be found adequate for practical purposes to assume a sinusoidal pressure drop curve in which case a convenient manner of arriving at the diameters of the contact circles at 24, 26 and 28 is to make them such that the square of the chamber diameter is equal to the average of the squares of the diameters at 24 and 26—28, the diameters at 26 and 28 being made equal. While this relationship does not produce absolute balance of the ball joints, its departure therefrom, where the arc of contact is small, is of such a low order of magnitude that it may be ignored in comparison with the frictional forces and the usual manufacturing tolerances.

While the form of embodiment of the invention as herein disclosed, constitutes a preferred form, it is to be understood that other forms might be adopted, all coming within the scope of the claims which follow.

What is claimed is as follows:

1. In a fluid pressure energy translating device an expansible chamber mechanism comprising a member forming a cylindrical chamber, a member having a cylindrical outer surface slidable in said chamber, means mounting said members for relative reciprocatory motion, said means including a pivot member having a spherical surface of a diameter somewhat larger than the diameter of said chamber, one of said first two members having a spherical surface in film forming contact with the pivot member over an area on both sides of a great circle sufficient to substantially balance the forces on said member created by fluid pressure in said chamber, said spherical surfaces being in fluid communication with said chamber.

2. In a fluid pressure energy translating device an expansible chamber mechanism comprising a member forming a cylindricel chamber, a member having a cylindrical outer surface slidable in said chamber having a portion formed with a spherical surface, means mounting said members for relative reciprocatory motion, said means including a pivot member having a spherical surface coacting with said first spherical surface with a film forming contact over a substantial area, the diameter of the spherical surfaces and the area of contact being so chosen with respect to the chamber diameter as to provide substantial balance between the fluid pressure forces acting on said member in the direction of the chamber axis.

3. In a fluid pressure energy translating device an expansible chamber mechanism comprising a member forming a cylindricel chamber, a member having a cylindrical outer surface slidable in said chamber, means mounting said members for relative reciprocatory motion, said means including a pivot member having a spherical surface of a diameter somewhat larger than the diameter of said chamber, one of said first two members having film forming contact with the pivot member over an area on both sides of a great circle such that the minimum diameter of the contact surface on either side of a great circle perpendicular to the chamber axis is less than the chamber diameter.

4. In a fluid pressure energy translating device an expansible chamber mechanism comprising a member forming a cylindricel chamber, a member having a cylindrical outer surface slidable in said chamber, means mounting said members for relative reciprocatory motion, said means including a pivot member having a spherical surface of a diameter somewhat larger than the diameter of said chamber, one of said first two members having film forming contact with the pivot member over an area on both sides of a great circle such that the minimum diameter of the contact surface on either side of a great circle perpendicular to the chamber axis is less than the chamber diameter and is smaller on the side toward the chamber than on the side away from the chamber.

5. A balanced ball joint for a fluid pressure energy translating device comprising in combination a member forming a movable part of a cylindrical expansible chamber and having a portion formed with a spherical surface, a second member having a portion formed with a spherical surface complemental to the other surface, said members being interfitted at their spherical surfaces and exposed to the fluid pressure in the expansible chamber over an area on both sides of a great circle sufficient to reduce the axial resultant fluid pressure force on the first member to a very small value compared to the fluid pressure force on the second member.

6. A balanced ball joint for a fluid pressure energy translating device comprising in combination a member forming a movable part of a cylindrical expansible chamber and having a portion formed with a spherical surface of a diameter at least as great as the chamber diameter, a second member having a portion formed with a spherical surface complemental to the other surface, said members being interfitted at their spherical surfaces and exposed to the fluid pressure in the expansible chamber over an area on both sides of a great circle sufficient to reduce the axial resultant fluid pressure force on the first member to a very small value compared to the fluid pressure force on the second member.

7. A balanced ball joint for a fluid pressure energy translating device comprising in combination a member forming a movable part of a cylindrical expansible chamber and having a portion formed with a spherical surface, a second member having a portion formed with a spherical surface complemental to the other surface, said members being interfitted at their spherical surfaces on both sides of the great circle perpendicular to the cylinder axis, and having an axially projected area of the interfitting surfaces which is annular and small relative to the cylinder area and which has a mean diameter approximating the cylinder diameter of the expansible chamber.

8. A balanced ball joint for a fluid pressure energy translating device comprising in combination a member forming a movable part of a cylindrical expansible chamber and having a portion formed with a spherical surface, a second member having a portion formed with a spherical surface complemental to the other surface, said members being interfitted at their spherical surfaces, said second member being exposed to a resultant force due to fluid pressure substantially equal to the force exerted by the fluid pressure in the expansible chamber over the cross sectional area thereof.

9. A balanced ball joint for a fluid pressure energy translating device comprising in combination a member forming a movable part of a cylindrical expansible chamber and having a portion formed with a spherical surface of a diameter greater than the chamber diameter, a second member having a portion formed with a spherical surface complemental to the other surface, said members being interfitted at their spherical surfaces to a diameter less than the chamber diameter at the side toward the chamber and to different and larger diameter, less than the chamber diameter, on the side away from the chamber.

10. A balanced ball joint for a fluid pressure energy translating device comprising in combination a member forming a movable part of a cylindrical expansible chamber and having a portion formed with a spherical surface of a diameter greater than the chamber diameter, a second member having a portion formed with a spherical surface complemental to the other surface, said members being interfitted at their spherical surfaces to a diameter less than the chamber diameter on both sides of the great circle perpendicular to the cylinder axis.

RALPH L. TWEEDALE.